(12) United States Patent
Ikegaya

(10) Patent No.: US 11,130,454 B2
(45) Date of Patent: Sep. 28, 2021

(54) ON-VEHICLE CONTROLLER

(71) Applicant: YAZAKI CORPORATION, Tokyo (JP)

(72) Inventor: Koji Ikegaya, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 384 days.

(21) Appl. No.: 16/127,112

(22) Filed: Sep. 10, 2018

(65) Prior Publication Data

US 2019/0126857 A1    May 2, 2019

(30) Foreign Application Priority Data

Oct. 31, 2017 (JP) .............................. JP2017-210789

(51) Int. Cl.
*B60R 16/023* (2006.01)
*B60R 16/03* (2006.01)
*G05B 23/02* (2006.01)
*G06F 1/12* (2006.01)
(Continued)

(52) U.S. Cl.
CPC ............ *B60R 16/023* (2013.01); *B60R 16/03* (2013.01); *G05B 23/0213* (2013.01); *G06F 1/26* (2013.01); *G06F 13/126* (2013.01)

(58) Field of Classification Search
CPC .......... H01R 13/66; H04L 12/28; H04Q 9/00; B60H 1/00; B60H 1/00642; B60H 1/00978; B60R 16/0234; B60R 16/02; B60R 16/023; B60R 16/03; B60R 16/0231; B60R 21/0173; G05B 23/02; G05B 23/0205; G05B 23/0208; G05B 23/0213; G06F 1/26; G06F 13/12; G06F 13/124; G06F 13/126
See application file for complete search history.

(56) References Cited

U.S. PATENT DOCUMENTS

2012/0242492 A1*  9/2012  Grunfeld ................ G08B 21/24
                                                                  340/667

FOREIGN PATENT DOCUMENTS

| JP | 2005-269468 A | 9/2005 |
| JP | 2007-126055 A | 5/2007 |
| JP | 2011-151622 A | 8/2011 |

OTHER PUBLICATIONS

"Abdel Azzeh, CAN Control System for an Electric Vehicle, Nov. 2005" (Retrieved from https://core.ac.uk/download/pdf/35458473.pdf on Nov. 5, 2020) (Year: 2005).*
(Continued)

*Primary Examiner* — Khoi H Tran
*Assistant Examiner* — Sarah A Tran
(74) *Attorney, Agent, or Firm* — Kenealy Vaidya LLP

(57) ABSTRACT

A module driver or a master obtains the load IDs of the respective first loads connected to the downstream side of the module driver, recognizes the classification of areas, such as door, roof and floor areas, or a module according to the obtained load IDs, and allocates an appropriate driver ID to the module driver in each area. Each first load has a load ID. The load IDs are allocated to the respective second loads on the downstream side of the module driver on the basis of the allocated driver ID. The area or the module is recognized on the basis of the combination of the load IDs of the plurality of first loads, whereby malfunctions caused by erroneous assembling of the first loads are suppressed.

3 Claims, 9 Drawing Sheets

(51) Int. Cl.
*G06F 1/26* (2006.01)
*G06F 13/12* (2006.01)

(56) References Cited

OTHER PUBLICATIONS

"Abdel Azzeh, CAN Control System for an Eclectic Vehicle, Nov. 2005" (Year: 2005).*

* cited by examiner

ON-VEHICLE CONTROLLER

CROSS REFERENCE TO RELATED APPLICATIONS

This application is based on and claims priority from Japanese patent application No. 2017-210789 filed on Oct. 31, 2017, the entire contents of which are incorporated herein by reference.

BACKGROUND OF THE INVENTION

1. Technical Field

The present invention relates to an on-vehicle controller, more particularly, to a technology for allocating identifiers (IDs).

2. Background Art

Generally, various loads including electrical components, such as switches, sensors and electronic control units (ECUs), are disposed in various areas, such as door, roof and seat areas in a vehicle. Furthermore, these electrical components in the respective areas are mutually connected via wire harness so that required electric power can be supplied from the vehicle to the electrical components, so that the plurality of electrical components can mutually communicate, and so that required signals can be input and output.

On the other hand, for example, in the case that a device having a control function, such as a microcomputer, is disposed in each area, it is possible to deal with the differences in the electrical components in the respective areas depending on, for example, the difference in the type of the vehicle and the change in the specifications thereof, by changing only the software of the microcomputer or the like. However, in the case that the microcomputers in the respective areas are connected in common to the same network on the vehicle, it is necessary to allocate identification information, such as unique IDs, to the microcomputers in the respective areas and to perform appropriate control for each ID.

Conventional technologies for allocating identification information to a plurality of control functions in a vehicle are disclosed, for example, in Patent Documents JP-A-2005-269468, JP-A-2007-126055, and JP-A-2011-151622.

Patent Document JP-A-2005-269468 discloses a technology for easily setting identification information, that is, a technology being capable of saving time and labor for individually managing respective control function-equipped connectors and being not required to add any constitution to electrical components or the like to which the connectors are connected. More specifically, in each control function-equipped connector, when its own identification information has been set, the control function-equipped connector transmits its own identification information to the other control function-equipped connectors. When its own identification information has not yet been set, the control function-equipped connector receives the identification information having been set in the other control function-equipped connectors via wire harness and sets, as its own identification information, identification information other than the identification information having been set to others.

Patent Document JP-A-2007-126055 discloses a technology for easily giving control-use identification IDs while preventing erroneous assembling of drive ICs. More specifically, IC sockets are disposed on a communication bus, and a communication control switch for individually switching the connections of the drive ICs mounted on the IC sockets to the communication bus between an effective state and an ineffective state is provided. Furthermore, the communication control switch is controlled so that the connections of the drive ICs on the IC sockets to the communication bus are sequentially made effective in the order of the arrangement of the IC sockets, and ID information is written sequentially in the respective drive ICs.

Patent Document JP-A-2011-151622 discloses a technology for making respective communication devices having the same configuration without giving unique identification information thereto and for reducing the number of working processes. More specifically, the current value of each connected resistor R is measured while the state of a switch is switched, and each communication device determines its own address according to the current value.

SUMMARY

It is assumed that, for example, the electrical components or the like disposed in each of various areas on a vehicle are managed as a module and that each module is controlled using a module driver disposed in each area. In the case that, for example, a device having a control function such as a microcomputer is incorporated in each module driver, it is possible to flexibly deal with the differences in the connection states of the various electrical components in each module and the differences in the specifications thereof by changing only software.

However, in the case that the module drivers in the plurality of areas are connected in common to the same network, unique IDs must be allocated to the respective module drivers. Furthermore, for example, in the case that the IDs of the respective module drivers are preliminarily determined, since the IDs of the module drivers are different from one another, the respective module drivers must be managed with part numbers different from one another. In other words, mutually different part numbers as many as the module drivers mounted on the same vehicle must be prepared, and the components having the respective part numbers and the working processes thereof must be managed independently. Hence, as the number of part numbers increases, component management cost and manufacturing cost will increase.

Hence, it is conceivable to use the technologies disclosed in Patent Documents JP-A-2005-269468, JP-A-2007-126055, and JP-A-2011-151622, for example. That is to say, if appropriate IDs can be allocated to the respective module drivers as necessary after manufacturing, highly versatile module drivers being managed with a common part number can be used in the plurality of areas, whereby the number of part numbers can be decreased and the cost can be reduced.

However, in the case that mutually different IDs are simply allocated to the module drivers in the plurality of areas, the loads connected to the downstream side of each module driver cannot be controlled appropriately. In other words, various kinds of loads may be connected to the downstream side of each module driver in each area, and the actual connection states and the types of the loads are different depending on the type of the vehicle and the specifications thereof, whereby the function to be achieved by each module driver cannot be managed using the ID allocated thereto. Consequently, the part numbers of the module drivers in the plurality of areas cannot be made common.

The present invention has been made in consideration of the above-mentioned circumferences, and the object of the present invention is to provide an on-vehicle controller capable of making the part numbers of module drivers in a plurality of areas common and appropriately performing control according to the actual connection states between each module driver and loads and the types of the loads.

To attain the above-mentioned object, an on-vehicle controller according to the present invention is characterized as described in the following items (1) to (3).

(1) An on-vehicle controller, including:
module drivers capable of being disposed in the respective plurality of areas on a vehicle to control first loads having their own load IDs and
a power distribution section configured so as to be able to communicate with the module drivers and so as to store the module driver IDs allocated to the respective plurality of areas while being associated with the respective load IDs, wherein
the module driver has a function of obtaining the load ID from the first load and transmitting the load ID to the power distribution section,
the power distribution section has a function of transmitting the module driver ID to the module driver on the basis of the received load ID, and
the module driver has a function of obtaining its own module driver ID.

(2) The on-vehicle controller set forth in the above-mentioned item (1), wherein
the module driver and the plurality of first loads to be controlled by the module driver are disposed in each of the plurality of areas,
the information to be transmitted from the module driver to the power distribution section includes the plurality of load IDs obtained from at least the plurality of first loads, and
the power distribution section determines the module driver ID on the basis of the plurality of load IDs.

(3) An on-vehicle controller, including:
module drivers capable of being disposed in the respective plurality of areas on a vehicle to control a plurality of first loads having their own load IDs and
a power distribution section configured so as to be able to communicate with the module drivers and so as to store the module driver IDs allocated to the respective plurality of areas while being associated with the respective load IDs, wherein
the power distribution section has a function of obtaining the respective load IDs from the plurality of first loads to be controlled by the respective module drivers via the respective module drivers and also has a function of transmitting the module driver IDs determined on the basis of the obtained respective load IDs to the respective module drivers, and
the respective module drivers have a function of obtaining their own module driver IDs.

With the on-vehicle controller configured as described in the above-mentioned item (1), the power distribution section can allocate an appropriate module driver ID to the module drivers in a plurality of areas on the basis of the load IDs of the first loads. Hence, the configurations and the functions of the module drivers in the plurality of areas can be made common, and these module drivers can be managed using the same part number. What's more, even if the actual connection states between each module driver and loads and the types of the loads are changed depending on the differences in the type of the vehicle or in the specifications thereof, an appropriate module driver ID can be allocated automatically in accordance with the loads actually connected.

With the on-vehicle controller configured as described in the above-mentioned item (2), since the power distribution section can obtain the respective load IDs of the plurality of first loads connected to the module driver in each area, the power distribution section can allocate an appropriate module driver ID to each module driver on the basis of the plurality of load IDs. More specifically, even in the case that erroneous assembling occurs in a load during vehicle production, the area of the corresponding module, for example, can be recognized properly on the basis of the load IDs of the other loads having been assembled properly, whereby the allocation of the module driver ID can be prevented from becoming different from the state intended by the design. Still further, the differences in the type of the vehicle or in the specifications thereof can be recognized on the basis of the actual combination of the plurality of first loads, for example.

With the on-vehicle controller configured as described in the above-mentioned item (3), the power distribution section can allocate an appropriate module driver ID to the module drivers in a plurality of areas on the basis of the combination of the load IDs of the plurality of first loads. Hence, the configurations and the functions of the module drivers in the plurality of areas can be made common, and these module drivers can be managed using the same part number. What's more, even in the case that erroneous assembling occurs in a load during vehicle production, the area of the corresponding module, for example, can be recognized properly on the basis of the load IDs of the other loads having been assembled properly, whereby the allocation of the module driver ID can be prevented from becoming different from the state intended by the design. Still further, even if the actual connection states between each module driver and loads and the types of the loads are changed depending on the differences in the type of the vehicle or in the specifications thereof, an appropriate module driver ID can be allocated automatically in accordance with the combinations of the loads actually connected.

With the on-vehicle controller according to the present invention, the part numbers of the module drivers in the plurality of areas can be made common. Furthermore, appropriate control can be performed easily according to the actual connection states between each module driver and loads and the types of the loads. The cost of the module drivers can be reduced by making the part numbers of the module drivers common.

The present invention has been described above briefly. Moreover, the details of the present invention will be further clarified by reading the descriptions of the modes (hereafter referred to as "embodiments") for embodying the invention to be described below referring to the accompanying drawings.

DETAILED DESCRIPTION OF EMBODIMENTS

A specific embodiment according to the present invention will be described below referring to the accompanying drawings.

<A Configuration Example of a Module Driver>

Figure 1:
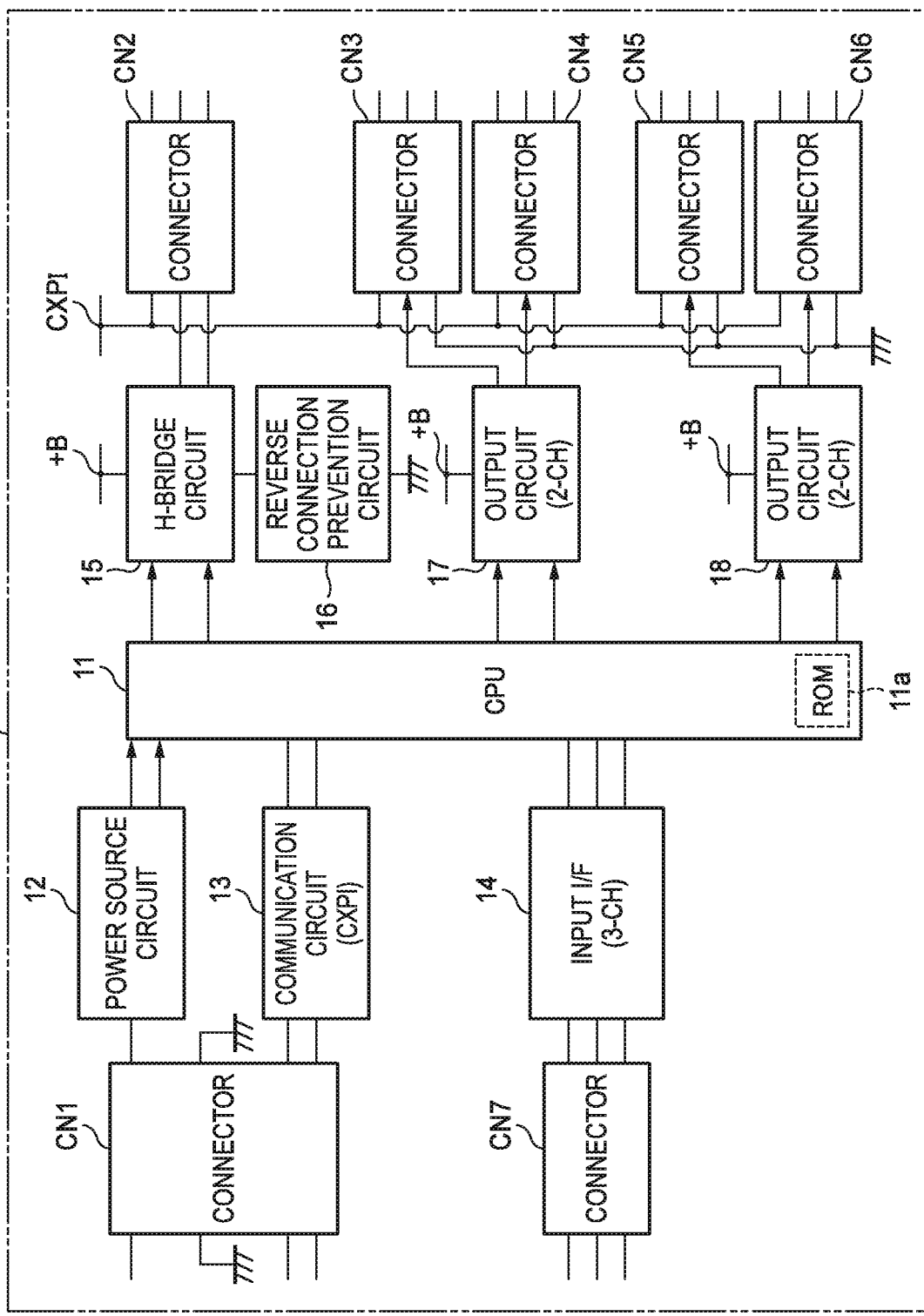
FIG. 1 is a block diagram showing a configuration example of a module driver.

FIG. 1 shows a configuration example of a module driver 10. The module driver 10 shown in FIG. 1 is used to control, for example, various on-vehicle devices modularized for each area on a vehicle, more specifically, loads, such as electronic control units (ECUs), motors, heaters, switches and sensors. Furthermore, the module drivers 10 are configured as highly versatile components having a common configuration and a common part number and also configured so that common components can be used in various areas.

The module driver 10 shown in FIG. 1 is equipped with a microcomputer (CPU) 11, a power source circuit 12, a communication circuit 13, an input interface (I/F) 14, an H-bridge circuit 15, a reverse connection prevention circuit 16, output circuits 17 and 18, and a plurality of connectors CN1 to CN7.

The microcomputer 11 executes predetermined programs, thereby being capable of performing control required so that the module driver 10 properly functions as the module driver 10 for each area. In the example shown in FIG. 1, various kinds of software (programs and data) corresponding to the respective functions to be achieved by the module drivers 10 in various areas have been preliminarily registered and held in the ROM 11a built in the microcomputer 11.

The module driver 10 can selectively obtain the software required in the area in which the module driver 10 itself is disposed from the ROM 11a on the basis of the driver ID allocated to the module driver 10 and can execute the software. Hence, by the switching of the driver ID to be allocated to the module driver 10, the function of the module driver 10 can be switched and the versatility of the module driver 10 can be enhanced. The software to be executed by the microcomputer 11 may be obtained by downloading from a higher-order device. Moreover, a non-volatile memory, such as a flash memory, may be used instead of the ROM 11a.

The connector CN1 of the module driver 10 is connected, for example, to a higher-order device (master) and a trunk line via a modular cable, described later. Hence, the module driver 10 can obtain the electric power (for example, the output of an on-vehicle battery) on the vehicle from the trunk line. In addition, communication can be performed between the higher-order device and the module driver 10.

The power source circuit 12 generates a power source voltage (for example, +5 [V]) to be used inside the module driver 10 on the basis of the electric power (+B) supplied from the vehicle via the connector CN1.

The communication circuit 13 is a transceiver capable of performing communication conforming to a standard such as the on-vehicle LAN standard "CXPI (Clock Extension Peripheral Interface)" for example. The microcomputer 11 inside the module driver 10 can communicate with on-vehicle devices connected to the higher-order device and the trunk line via the connector CN1 and the communication circuit 13.

Furthermore, the communication lines (CXPI) of the connector CN1 are connected to the respective connectors CN2 to CN6 through the inside of the module driver 10. Hence, the various loads connected to the respective connectors CN2 to CN6 can communicate with the module driver 10 and can also communicate with the higher-order devices other than the module driver 10.

The input interface (I/F) 14 can supply respective three-system (3-CH) independent input signals input from the device connected to the connector CN7 to the microcomputer 11.

Like a general H-bridge circuit, the H-bridge circuit 15 incorporates four switching devices bridge-connected in an H-shape. The H-bridge circuit 15 can perform energization control for a load, such as a motor or a heater, requiring a relatively large current using a switching device, such as an intelligent power device (IPD). What's more, the direction along which a current flows can be controlled and the magnitude of the current can be controlled by pulse width modulation (PWM) using the H-bridge circuit 15.

The reverse connection prevention circuit 16 has a function of preventing the H-bridge circuit 15 from malfunctioning at the time of reverse connection of the power source, for example.

The two outputs of the H-bridge circuit 15 are connected to the connector CN2. The connector CN2 includes two terminals connected to the outputs of the H-bridge circuit 15 and one terminal connected to the communication line (CXPI).

Each of the output circuits 17 and 18 incorporates a two-system (2-CH) switching circuit. Each switching circuit is composed of, for example, an intelligent power device (IPD) and is used to on/off switching the connection to the power source lines on the high potential side (Hi side). Hence, the electric power to be supplied to a load can be on/off controlled or the magnitude of the current to be supplied thereto can be controlled by pulse width modulation using the output circuit 17 or 18.

The two-system outputs of the output circuit 17 are respectively connected to the connector CN3 and the connector CN4. Furthermore, the two-system outputs of the output circuit 18 are respectively connected to the connector CN5 and the connector CN6. Each of the connectors CN3 to CN6 includes three terminals respectively connected to the output of the output circuit 17 or 18, earth, and the communication line (CXPI).

Signals from various switches, for example, are assumed to be input to the three terminals of the connector CN7 as necessary.

<A Configuration Example of an On-Vehicle Controller>
<In the Case of the Door Area>

Figure 2:
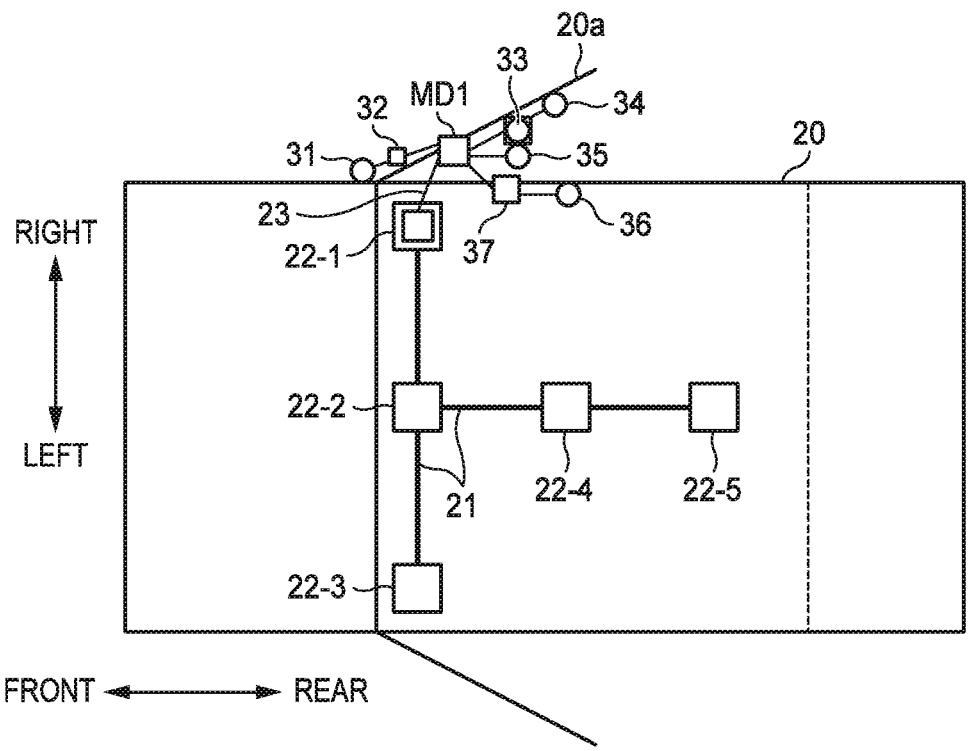
FIG. 2 is a plan view showing a layout and connection states relating to a configuration example of an on-vehicle controller including the module in the door area of a vehicle.

FIG. 2 is a plan view showing a layout and connection states relating to a configuration example of an on-vehicle controller including the module in the door area.

In the example shown in FIG. 2, a trunk line 21 includes a section disposed so as to extend in the left-right direction along the instrument panel of a vehicle body 20 and a section disposed so as to extend in the front-rear direction inside the cabin in the vicinity of the center of the vehicle body 20 and is formed into a T-shape. This trunk line 21 includes power source lines, an earth line and two optical fibers. Electric wires may be used instead of the optical fibers. Moreover, in the case that vehicle body earth can be used, the earth line of the trunk line 21 can be omitted.

Infrastructural power distribution boxes 22-1, 22-2, 22-3, 22-4 and 22-5 are connected to the respective sections of the trunk line 21. These infrastructural power distribution boxes 22-1, 22-2, 22-3, 22-4 and 22-5 include a function for distributing the electric power of the on-vehicle battery or the like and for supplying the electric power to the modules in respective areas via the trunk line 21 and also include a communication function. Furthermore, the communication function of each of the infrastructural power distribution boxes 22-1, 22-2, 22-3, 22-4 and 22-5 includes a converter for converting optical signals into electrical signals and a converter for converting electrical signals into optical signals. Moreover, each of the infrastructural power distribution boxes 22-1, 22-2, 22-3, 22-4 and 22-5 includes an electronic control unit (ECU) for controlling each module.

In the configuration shown in FIG. 2, the ECU inside the infrastructural power distribution box 22-1 connected to the right end of the trunk line 21 has a function of controlling the module located in the area in the vicinity of the right side door 20*a*.

In the example shown in FIG. 2, the module in the vicinity of the right side door 20*a* is equipped with a module driver MD1, an outer mirror motor 31, control section-equipped connectors 32, 33 and 37, a power window motor 34 and a door lock motor 35.

Highly versatile components having the same configuration as that of the module driver 10 shown in FIG. 1 can be used for the module driver MD1. The connector CN1 (see FIG. 1) of the module driver MD1 shown in FIG. 2 is connected to the infrastructural power distribution box 22-1 and the trunk line 21 via a modular cable 23.

The outer mirror motor 31 is connected to any one of the connectors CN2 to CN6 of the module driver MD1 via the control section-equipped connector 32. The power window motor 34 is connected to any one of the connectors CN2 to CN6 of the module driver MD1 via the control section-equipped connector 33. The door lock motor 35 is connected to any one of the connectors CN2 to CN6 of the module driver MD1 via the control section-equipped connector 37. Each of the control section-equipped connectors 32, 33 and 37 incorporates minimum control functions in addition to a communication function.

The driver ID of the module driver MD1 is changeable, and for example "001" is allocated as the driver ID of the module driver MD1 in the initial state. After an on-vehicle system has started operation, an appropriate driver ID is allocated to the module driver MD1 by the control of the infrastructural power distribution box 22-1. Driver ID allocation control will be described later in detail.

<In the Case of the Roof Area>

Figure 3:
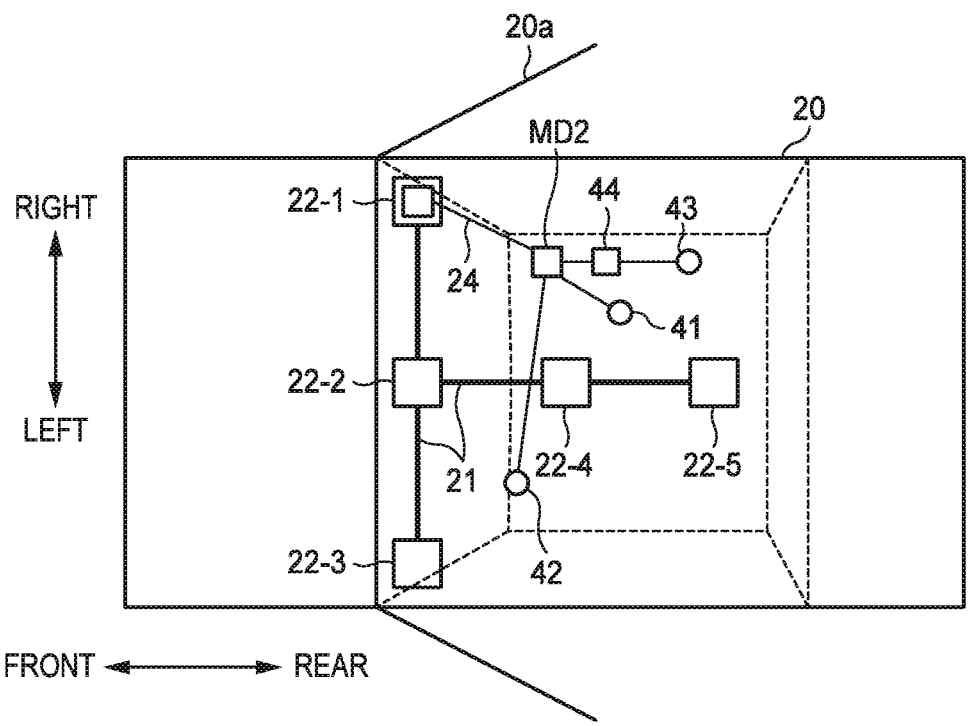
FIG. 3 is a plan view showing a layout and connection states relating to a configuration example of the on-vehicle controller including the module in the roof area of the vehicle.

FIG. 3 is a plan view showing a layout and connection states relating to a configuration example of the on-vehicle controller including the module in the roof area. Also in the example shown in FIG. 3, as in FIG. 2, the trunk line 21 and the infrastructural power distribution boxes 22-1 to 22-5 are provided on the vehicle body 20.

In the configuration shown in FIG. 3, the ECU inside the infrastructural power distribution box 22-1 connected to the right end of the trunk line 21 is provided with a function for controlling the module disposed in the vicinity of the roof area of the vehicle body 20.

In the example shown in FIG. 3, the module in the vicinity of the roof area of the vehicle body 20 is equipped with a module driver MD2, a roof sliding unit 41, a vanity lamp 42, an LED illumination unit 43 and a control section-equipped connector 44.

Highly versatile components having the same configuration as that of the module driver 10 shown in FIG. 1 can be used for the module driver MD2. The connector CN1 (see FIG. 1) of the module driver MD2 shown in FIG. 3 is connected to the infrastructural power distribution box 22-1 and the trunk line 21 via a modular cable 24.

The roof sliding unit 41 is connected to any one of the connectors CN2 to CN6 of the module driver MD2. The vanity lamp 42 is also connected to any one of the connectors CN2 to CN6 of the module driver MD2.

The LED illumination unit 43 incorporates a multicolor LED and can emit light in various light-emitting colors. The LED illumination unit 43 is connected to any one of the connectors CN2 to CN6 of the module driver MD2 via the control section-equipped connector 44. The control section-equipped connector 44 incorporates minimum control functions in addition to a communication function.

The driver ID of the module driver MD2 is changeable, and for example "001" is allocated as the driver ID of the module driver MD2 in the initial state. After an on-vehicle system has started operation, an appropriate driver ID is allocated to the module driver MD2 by the control of the infrastructural power distribution box 22-1. Driver ID allocation control will be described later in detail.

<In the Case of the Floor Area>

Figure 4:
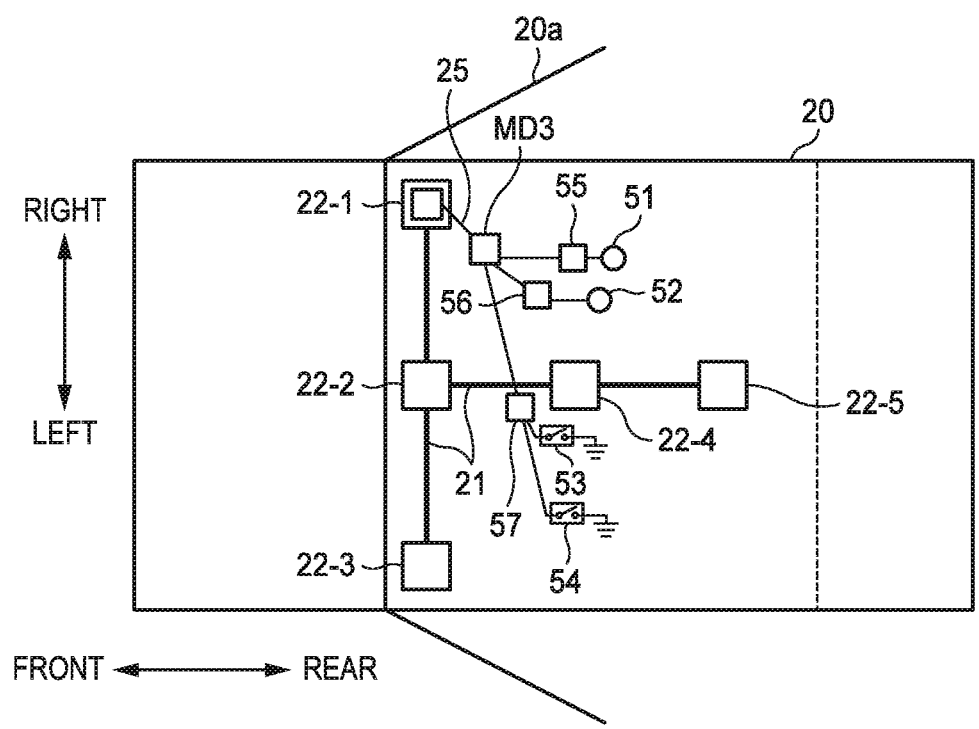
FIG. 4 is a plan view showing a layout and connection states relating to a configuration example of the on-vehicle controller including the module in the floor area of the vehicle.

FIG. 4 is a plan view showing a layout and connection states relating to a configuration example of the on-vehicle controller including the module in the floor area. Also in the example shown in FIG. 4, as in FIG. 2, the trunk line 21 and the infrastructural power distribution boxes 22-1 to 22-5 are provided on the vehicle body 20.

In the configuration shown in FIG. 4, the ECU inside the infrastructural power distribution box 22-1 connected to the right end of the trunk line 21 is provided with a function for controlling the module disposed in the vicinity of the floor (actually seat) area of the vehicle body 20.

In the example shown in FIG. 4, the module in the vicinity of the floor area of the vehicle body 20 is equipped with a module driver MD3, a seat heater 51, an outer mirror switch 52, a hazard switch 53, a courtesy switch 54 and control section-equipped connectors 55, 56 and 57.

Highly versatile components having the same configuration as that of the module driver 10 shown in FIG. 1 can be used for the module driver MD3. The connector CN1 (see FIG. 1) of the module driver MD3 shown in FIG. 4 is connected to the infrastructural power distribution box 22-1 and the trunk line 21 via a modular cable 25.

The seat heater 51 is connected to any one of the connectors CN2 to CN6 of the module driver MD3 via the control section-equipped connector 55. The outer mirror switch 52 is connected to any one of the connectors CN2 to CN6 of the module driver MD3 via the control section-equipped connector 56. The hazard switch 53 and the courtesy switch 54 are connected to any one of the connectors CN2 to CN6 of the module driver MD3 via the same control section-equipped connector 57. Each of the control section-equipped connectors 55, 56 and 57 incorporates minimum control functions in addition to a communication function.

The driver ID of the module driver MD3 is changeable, and for example "001" is allocated as the driver ID of the module driver MD3 in the initial state. After an on-vehicle system has started operation, an appropriate driver ID is allocated to the module driver MD3 by the control of the infrastructural power distribution box 22-1. Driver ID allocation control will be described later in detail.

<Specific Examples of Driver ID Allocation>
<In the Case of the Door Area>

Figure 5:
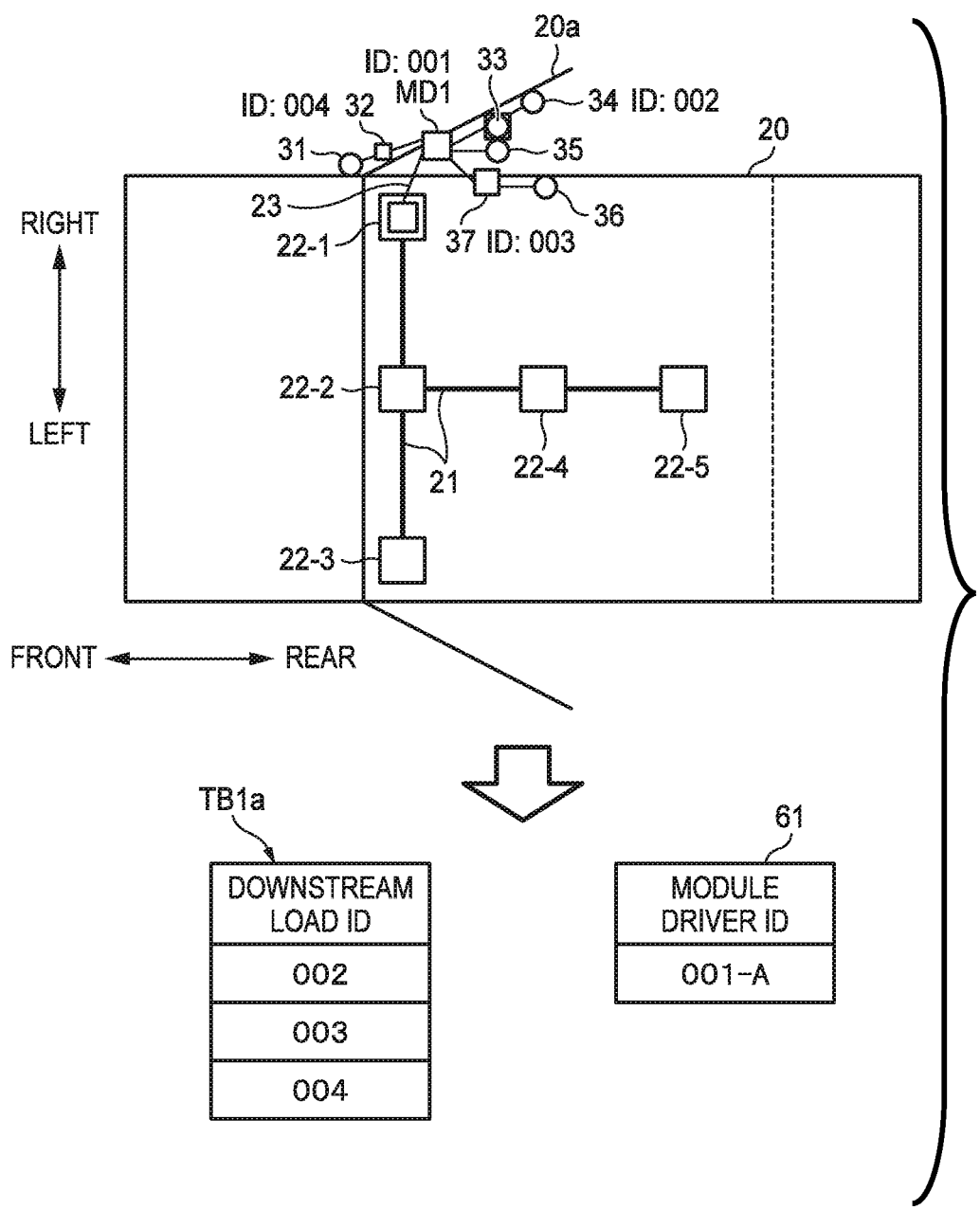
FIG. 5 is a schematic view showing an example in the case that IDs are allocated to the module shown in FIG. 2.

FIG. 5 shows a specific example in the case that IDs are allocated to the module in the door area shown in FIG. 2.

In the example shown in FIG. 5, it is assumed that the load IDs of the power window motor 34, a courtesy lamp 36 and the outer mirror motor 31 respectively connected to the downstream side of the module driver MD1 as loads have been set preliminarily to "002", "003" and "004" respectively.

In reality, load ID "002" is held in the control section-equipped connector 33 that is used to connect the power window motor 34. Furthermore, load ID "003" is held in the control section-equipped connector 37 that is used to connect the courtesy lamp 36. Moreover, load ID "004" is held in the control section-equipped connector 32 that is used to connect the outer mirror motor 31. Hence, the control section-equipped connectors 33, 37 and 32 can transmit the load IDs "002", "003" and "004" respectively to the module driver MD1 or the infrastructural power distribution box 22-1.

Furthermore, the initial value of the driver ID of the module driver MD1 is "001". The module driver MD1 can transmit the load IDs "002", "003" and "004" obtained from the downstream side to the higher-order infrastructural power distribution box 22-1.

On the other hand, the ECU inside the infrastructural power distribution box 22-1 preliminarily holds the door area load ID data TB1a shown in FIG. 5 as part of a table disposed on the internal storage device thereof. The door area load ID data TB1a shows the combination of the load IDs of the respective loads to be connected to the downstream side of the module driver MD1 as the module in the door area.

In other words, in the example shown in FIG. 5, on the basis of the content of the door area load ID data TB1a, the infrastructural power distribution box 22-1 preliminarily grasps that the respective loads having the load IDs "002", "003" and "004" are connected as the module in the door area. For example, in the case that the content of the respective load IDs transmitted from the respective loads or the module driver MD1 to the infrastructural power distribution box 22-1 is the same as the content of the door area load ID data TB1a, the infrastructural power distribution box 22-1 can recognize that the module driver MD1 is disposed in the door area.

Hence, the infrastructural power distribution box 22-1 allocates preliminarily determined driver ID 61 "001-A" to the module driver MD1 as the driver ID of the module in the door area. In other words, the infrastructural power distribution box 22-1 determines the driver ID "001-A" of the module driver MD1 on the basis of the load IDs of the loads actually connected to the downstream side of the module driver MD1.

<In the Case of the Roof Area>

Figure 6:
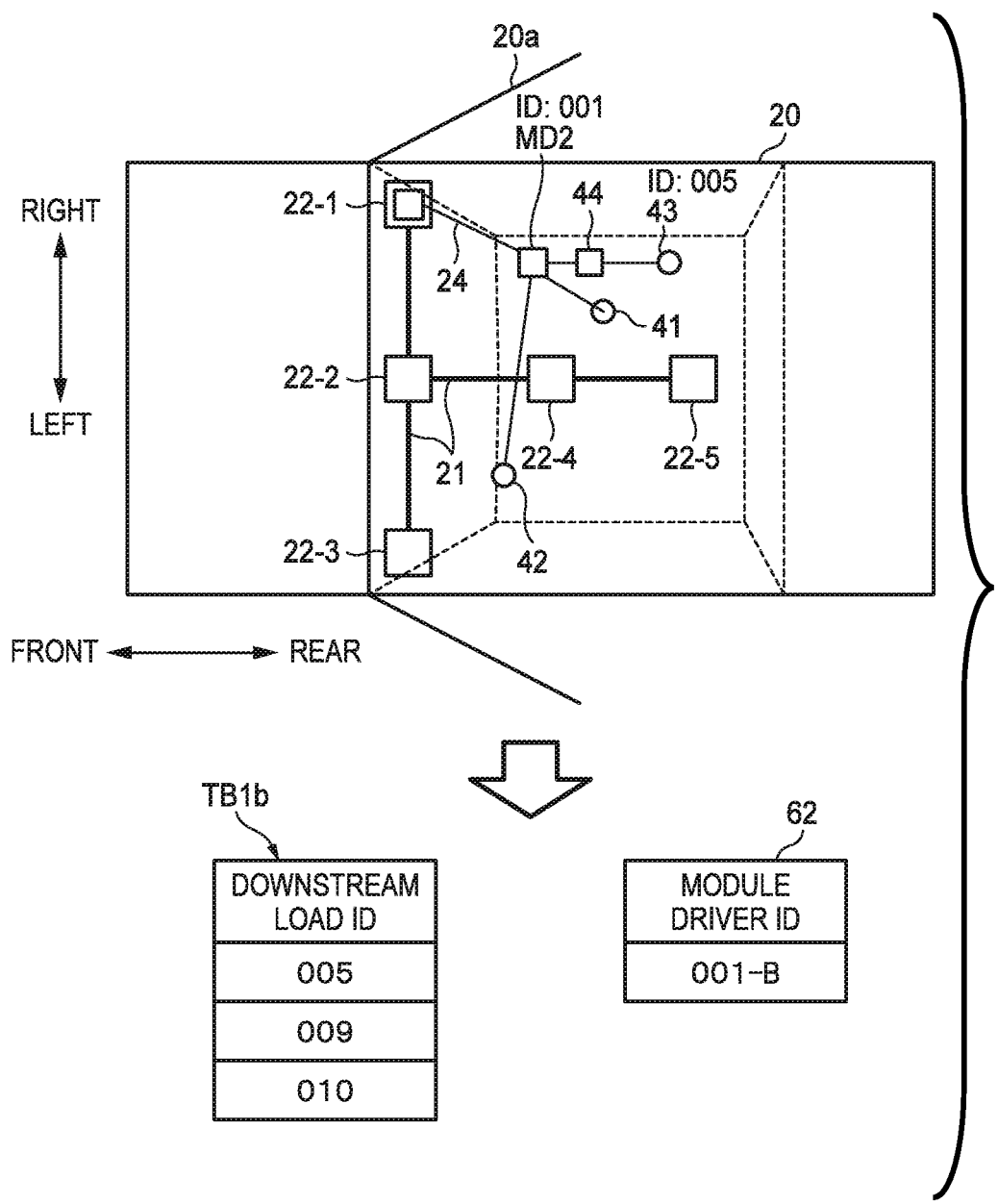
FIG. 6 is a schematic view showing an example in the case that IDs are allocated to the module shown in FIG. 3.

FIG. 6 shows a specific example in the case that IDs are allocated to the module in the roof area shown in FIG. 3.

In the example shown in FIG. 6, it is assumed that the load ID of the LED illumination unit 43 connected to the downstream side of the module driver MD2 as a load has been set preliminarily to "005".

In reality, load ID "005" is held in the control section-equipped connector 44 that is used to connect the LED illumination unit 43. Hence, the control section-equipped connector 44 can transmit the load ID "005" to the module driver MD2 or the infrastructural power distribution box 22-1.

Furthermore, the initial value of the driver ID of the module driver MD2 is "001". The module driver MD2 can transmit the load ID "005" obtained from the downstream side to the higher-order infrastructural power distribution box 22-1.

On the other hand, the ECU inside the infrastructural power distribution box 22-1 preliminarily holds the roof area load ID data TB1b shown in FIG. 6 as part of a table disposed on the internal storage device thereof. The roof area load ID data TB1b shows the combination of the load IDs of the respective loads to be connected to the downstream side of the module driver MD2 as the module in the roof area.

In other words, in the example shown in FIG. 6, on the basis of the content of the roof area load ID data TB1b, the infrastructural power distribution box 22-1 preliminarily grasps that the respective loads having the load IDs "005", "009" and "010" can be connected as the module in the roof area. For example, in the case that the content of the respective load IDs transmitted from the respective loads or the module driver MD2 to the infrastructural power distribution box 22-1 is the same as the content of the roof area load ID data TB1b, the infrastructural power distribution box 22-1 can recognize that the module driver MD2 is disposed in the roof area.

Hence, the infrastructural power distribution box 22-1 allocates preliminarily determined driver ID 62 "001-B" to the module driver MD2 as the driver ID of the module in the roof area. In other words, the infrastructural power distribution box 22-1 determines the driver ID "001-B" of the module driver MD1 on the basis of the load IDs of the loads actually connected to the downstream side of the module driver MD2.

<In the Case of the Floor Area>

Figure 7:
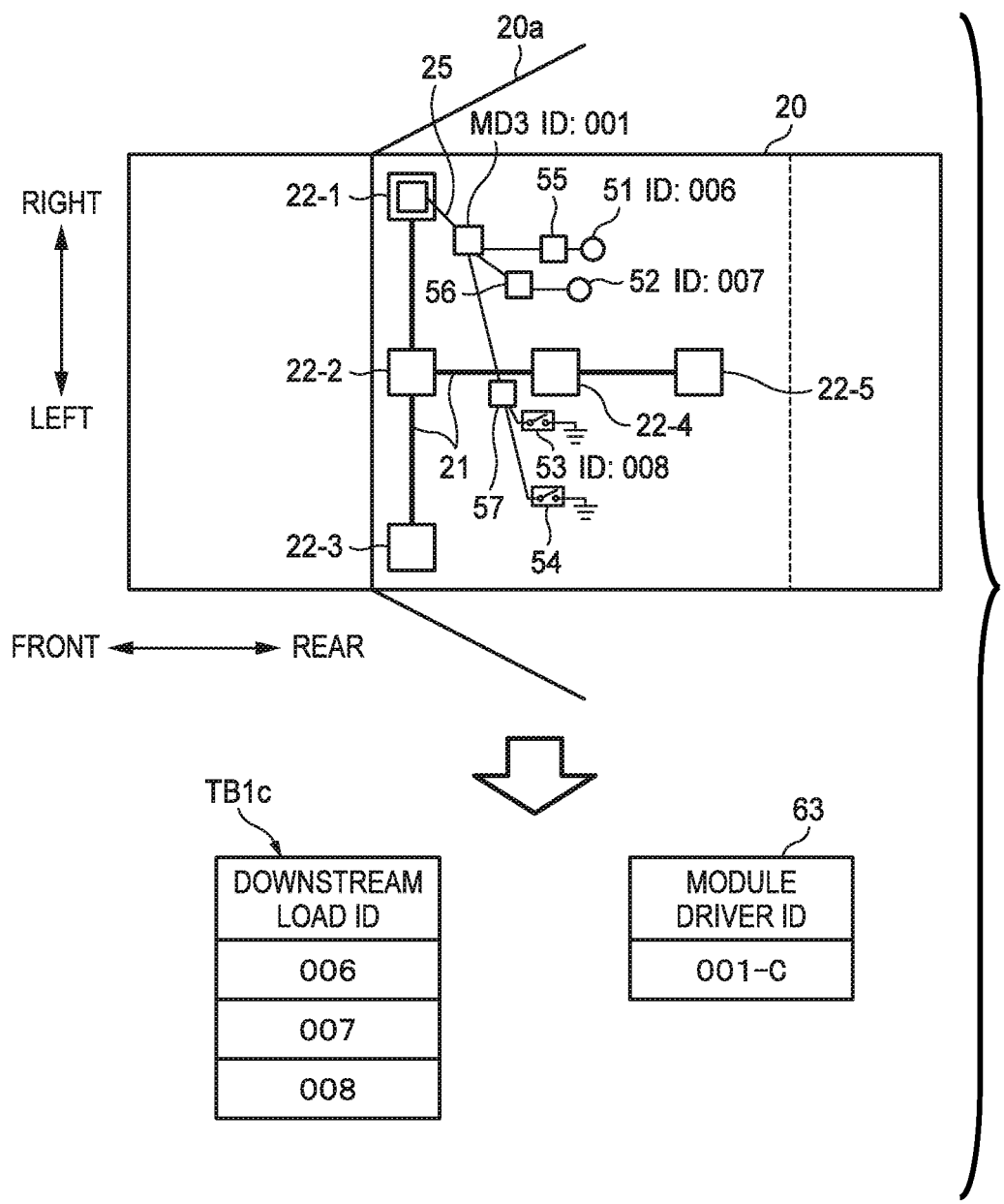
FIG. 7 is a schematic view showing an example in the case that IDs are allocated to the module shown in FIG. 4.

FIG. 7 shows a specific example in the case that IDs are allocated to the module in the floor area shown in FIG. 4.

In the example shown in FIG. 7, it is assumed that the load IDs of the seat heater 51, an outer mirror switch 52 and the hazard switch 53 respectively connected to the downstream side of the module driver MD3 as loads have been set preliminarily to "006", "007" and "008" respectively.

In reality, load ID "006" is held in the control section-equipped connector 55 that is used to connect the seat heater 51. Furthermore, load ID "007" is held in the control section-equipped connector 56 that is used to connect the outer mirror switch 52. Moreover, load ID "008" is held in the control section-equipped connector 57 that is used to connect the hazard switch 53. Hence, the control section-equipped connectors 55, 56 and 57 can transmit the load IDs "006", "007" and "008" respectively to the module driver MD3 or the infrastructural power distribution box 22-1.

Furthermore, the initial value of the driver ID of the module driver MD3 is "001". The module driver MD3 can transmit the load IDs "006", "007" and "008" obtained from the downstream side to the higher-order infrastructural power distribution box 22-1.

On the other hand, the ECU inside the infrastructural power distribution box 22-1 preliminarily holds the floor area load ID data TB1c shown in FIG. 7 as part of a table disposed on the internal storage device thereof. The floor area load ID data TB1c shows the combination of the load IDs of the respective loads to be connected to the downstream side of the module driver MD3 as the module in the floor area.

In other words, in the example shown in FIG. 7, on the basis of the content of the floor area load ID data TB1c, the infrastructural power distribution box 22-1 preliminarily grasps that the respective loads having the load IDs "006", "007" and "008" are connected as the module in the floor area. For example, in the case that the content of the respective load IDs transmitted from the respective loads or the module driver MD3 to the infrastructural power distribution box 22-1 is the same as the content of the floor area load ID data TB1c, the infrastructural power distribution box 22-1 can recognize that the module driver MD3 is disposed in the floor area.

Hence, the infrastructural power distribution box 22-1 allocates preliminarily determined driver ID 63 "001-C" to the module driver MD3 as the driver ID of the module in the floor area. In other words, the infrastructural power distribution box 22-1 determines the driver ID "001-C" of the module driver MD3 on the basis of the load ID of the loads actually connected to the downstream side of the module driver MD3.

<Control Operation for Driver ID Allocation>

Figure 8:
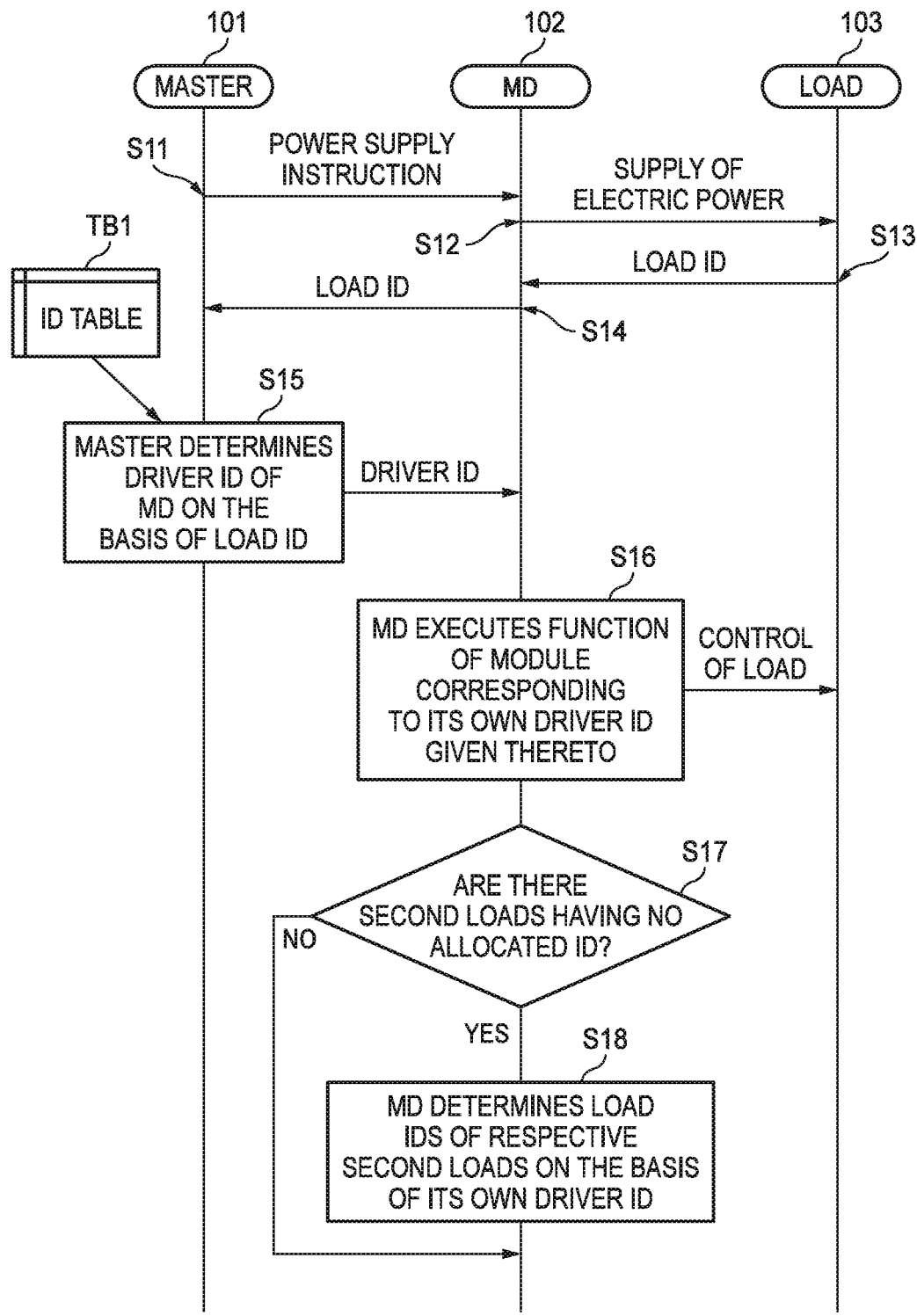
FIG. 8 is a flow chart showing an operation example of the respective sections of the on-vehicle controller for allocating IDs to the respective modules.

FIG. 8 shows an operation example of the respective sections of the on-vehicle controller for allocating IDs to the respective modules. More specifically, for example, the infrastructural power distribution box 22-1 shown in FIGS. 2 to 4 and serving as a master 101 performs control as shown in FIG. 8, whereby the infrastructural power distribution box 22-1 can allocate appropriate driver IDs to, for example, the respective module drivers MD1, MD2 and MD3 shown in FIGS. 2 to 4. Furthermore, an appropriate load ID can be allocated to a second load having no load ID. The module driver (MD) 102 shown in FIG. 8 corresponds to each of the module drivers MD1 to MD3. Moreover, the load 103 shown in FIG. 8 corresponds to, for example, each of the control section-equipped connectors 33, 37, 32, etc. connected to the downstream side of each of the module drivers MD1 to MD3.

The control operation shown in FIG. 8 will be described below.

When the master 101 outputs a power supply instruction at S11, the module driver 102 starts the supply of electric power to the load 103 at S12. The load 103 starts operation when the electric power is supplied thereto and transmits the load ID allocated thereto to the module driver 102 at S13. The module driver 102 transmits the load ID information received from the load 103 to the master 101 at S14.

The master 101 receives the load ID transmitted by the load 103, compares the load ID with the content of an ID table TB1 and determines an appropriate driver ID to be allocated to the module driver 102 at S15. After that, the master 101 transmits the determined driver ID to the module driver 102.

The ID table TB1 preliminarily holds the information of the load IDs of one or more "first loads" designed so as to be connectable to the module driver 102 of the corresponding module. The "first load" herein means a load having the information of a unique load ID allocated preliminarily. For example, each of the control section-equipped connectors 33, 37, 32, etc. is the "first load". On the other hand, a load having no load ID information, such as a simple load having no control function and no communication function, is a "second load".

Hence, for example, in the case that the infrastructural power distribution box 22-1 serving as the master 101 controls the respective modules in the door area, the roof area and the floor area shown in FIGS. 2 to 4, the door area load ID data TB1a, the roof area load ID data TB1b and the floor area load ID data TB1c shown in FIGS. 5 to 7 are included in the ID table TB1 on the infrastructural power distribution box 22-1.

For example, in the case that the load ID received by the master 101 from the module driver 102 is "002", the received load ID "002" coincides with the load ID "002" (see FIG. 5) on the door area load ID data TB1a, whereby the infrastructural power distribution box 22-1 recognizes that the module driver 102 is disposed in the door area. After that, the infrastructural power distribution box 22-1 allocates the driver ID61 "001-A" to the module driver 102 for controlling the module in the door area.

On the other hand, the module driver 102 recognizes the driver ID informed by the master 101 as the driver ID given thereto and hereafter executes the function of the module corresponding to the given driver ID (at S16).

For example, in the case that the driver ID "001-A" of the module in the door area is given to the module driver 102, the microcomputer 11 inside the module driver 102 selectively reads specific software allocated for the module in the door area from the ROM 11a and executes the software.

Furthermore, in the case that the driver ID "001-B" of the module in the roof area is given to the module driver 102, the microcomputer 11 inside the module driver 102 selectively reads specific software allocated for the module in the roof area from the ROM 11a and executes the software.

Moreover, in the case that the driver ID "001-C" of the module in the floor area is given to the module driver 102, the microcomputer 11 inside the module driver 102 selectively reads specific software allocated for the module in the floor area from the ROM 11a and executes the software.

Hence, even in the case that the module drivers 10 having a common configuration and a common part number are used as common components in various areas of the vehicle body 20, the module driver 10 disposed in each area can automatically select the software suitable for the area in which the module driver 10 is actually disposed and can appropriately control the corresponding module.

On the other hand, in the case that, in addition to the "first loads", "second loads" having no load ID are connected to the downstream side of the module driver 102, the processing of the module driver 102 proceeds from S17 to S18 and the module driver 102 allocates load IDs to the "second loads". The values of the load IDs to be allocated to the respective "second loads" are determined automatically so as not to be overlapped on the basis of driver IDs allocated to the module driver 102.

For example, in the case that the driver ID of the module driver 102 is "001-A", the module driver 102 allocates an appropriate load ID as a "second load" belonging to the door area. Furthermore, in the case that the driver ID of the module driver 102 is "001-B", the module driver 102 allocates an appropriate load ID as a "second load" belonging to the roof area. Moreover, in the case that the driver ID of the module driver 102 is "001-C", the module driver 102 allocates an appropriate load ID as a "second load" belonging to the floor area. Hence, the module driver 102 can easily grasp that each "second load" belongs to the module in which the "second load" is disposed according to the load ID allocated thereto. Furthermore, it is easy to prevent the same load ID from being allocated to a plurality of loads and overlapped.

<A Specific Operation Example of Driver ID Allocation>

Figure 9:
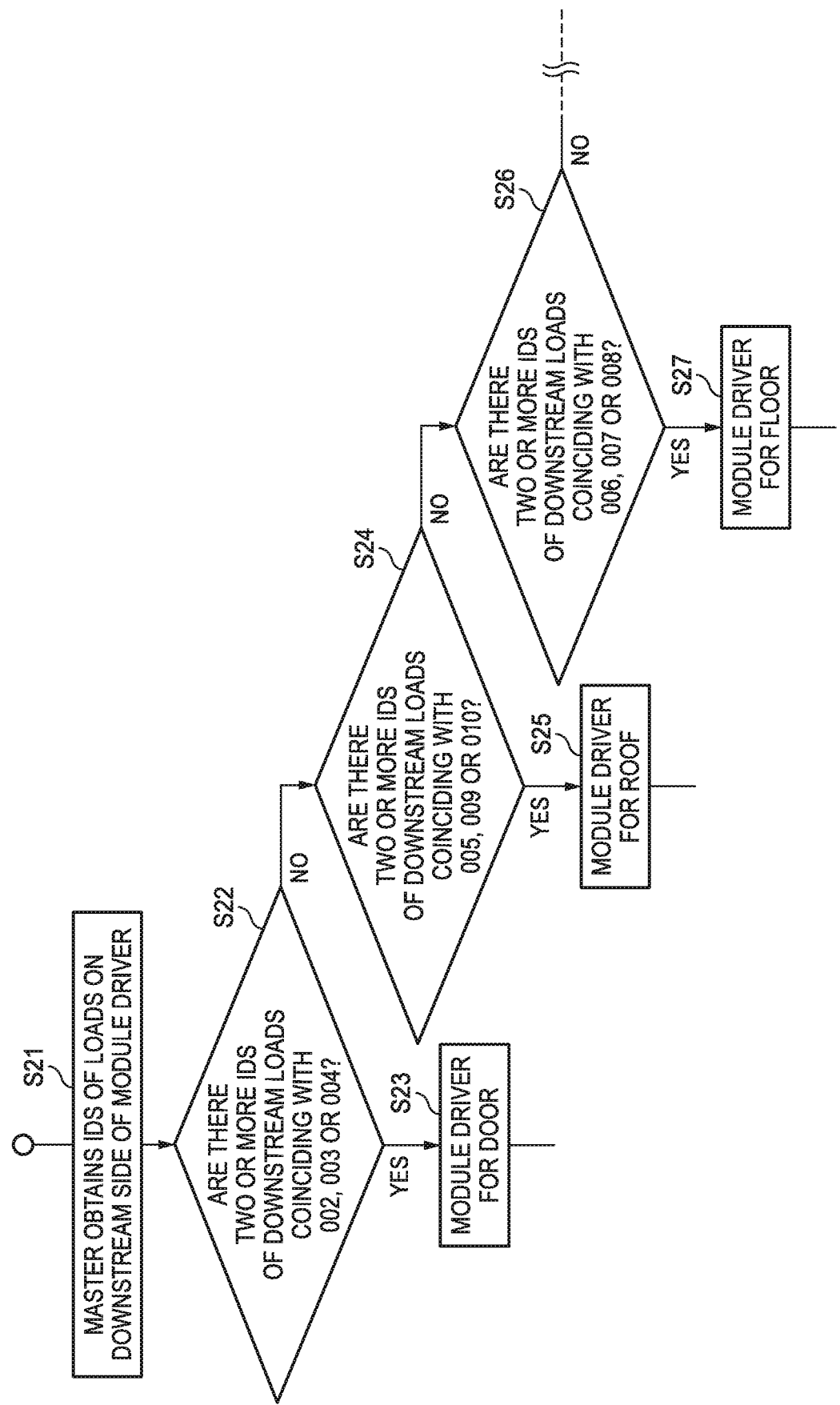
FIG. 9 is a flow chart showing a specific operation example for allocating driver IDs to the respective module drivers.

FIG. 9 shows a specific operation example for allocating appropriate driver IDs to the module drivers in the respective areas.

For example, in the case that a vehicle is assembled at a factory of a vehicle manufacturer, at the time when various loads are connected to the downstream side of the module driver in each area via connectors, for example, if the shapes of a plurality of connectors are common, there is a possibility that some loads are erroneously assembled to connectors for use in areas different from the area specified by the design. If such erroneous assembling occurs in a "first load", when the master 101 determines the driver ID of the module driver 102, the master 101 may incorrectly recognize the corresponding area and may allocate an inappropriate driver ID to the module driver 102. In that case, the module driver 102 selects inappropriate software from the ROM 11*a* and executes the software on the basis of the driver ID allocated thereto, whereby the module driver 102 will perform erroneous operation different from that according to the design specifications.

However, the above-mentioned erroneous operation can be prevented by executing the operation shown in FIG. 9. More specifically, in the operation shown in FIG. 9, the master 101 performs control so that the master 101 or the module driver 102 can recognize the area or module in which the corresponding module driver 102 is disposed on the basis of the combination of the load IDs of the plurality of loads connected to the downstream side of the module driver 102. Hence, even in the case that one of the plurality of "first loads" connected to the downstream side of the module driver 102 is erroneously assembled, the master 101 or the module driver 102 can properly recognize the area or module in which the corresponding module driver 102 is disposed on the basis of the load ID of the "first load" connected properly.

The operation shown in FIG. 9 can be performed, for example, as part of the control operation shown in FIG. 8 by either the master 101 or the module driver 102. The case in which the master 101 performs this operation is herein assumed and described below.

The master 101 obtains the respective load IDs of the plurality of "first loads" connected to the downstream side of the module driver 102 at S21.

The master 101 compares the respective load IDs obtained at S21 with "002", "003" and "004" in the load ID data TB1*a* in the door area at S22. In the case that two or more of the plurality of load IDs obtained at S21 coincide with either one of "002", "003" and "004", the processing proceeds to S23. And then, the master 101 recognizes that the corresponding module driver 102 belongs to the module disposed in the door area.

Furthermore, in the case that the load IDs do not satisfy the condition at S22, the master 101 compares the respective IDs obtained at S21 with "005", "009" and "010" in the load ID data TB1*b* in the roof area at S24. In the case that two or more of the plurality of load IDs obtained at S21 coincide with either one of "005", "009" and "010", the processing proceeds to S25. And then, the master 101 recognizes that the corresponding module driver 102 belongs to the module disposed in the roof area.

Moreover, in the case that the load IDs do not satisfy the condition at S24, the master 101 compares the respective IDs obtained at S21 with "006", "007" and "008" in the load ID data TB1*c* in the floor area at S26. In the case that two or more of the plurality of load IDs obtained at S21 coincide with either one of "006", "007" and "008", the processing proceeds to S27. And then, the master 101 recognizes that the corresponding module driver 102 belongs to the module disposed in the floor area.

Also with respect to the modules disposed in areas other than the door area, the roof area and the floor area, the master 101 can properly recognize that the area in which the module driver 102 is disposed and the module to which the module driver 102 belongs by performing comparison processing similar to that shown in FIG. 9. Hence, an appropriate driver ID can be allocated to the module driver 102.

<A Modified Operation Example of Driver ID Allocation>

Figure 10:
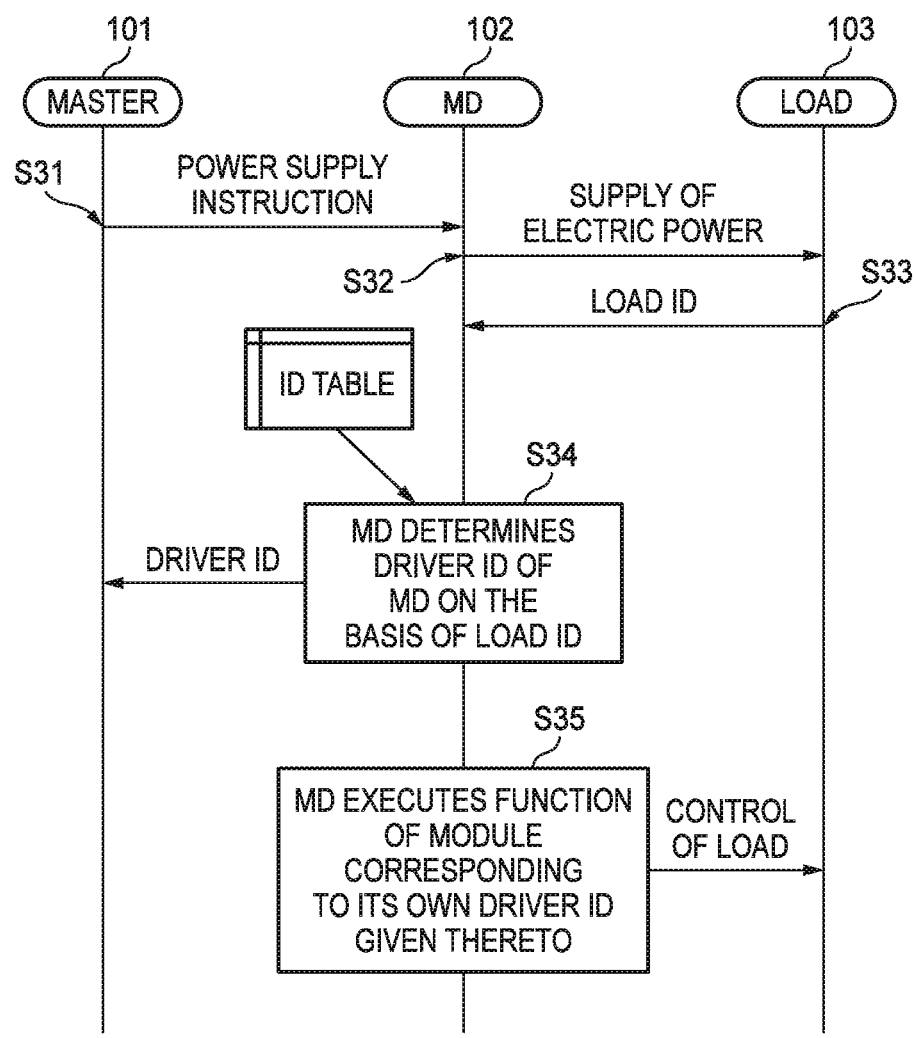
FIG. 10 is a flow chart showing a modified operation example of the respective sections of the on-vehicle controller for allocating IDs to the respective modules.

FIG. 10 shows a modified operation example of the on-vehicle controller for allocating IDs to the respective modules. More specifically, although the master 101 determines the driver ID of the module driver 102 in the operation shown in FIG. 8, the module driver 102 itself determines its own driver ID in the modified operation example shown in FIG. 10.

The control operation shown in FIG. 10 will be described below. The ID table TB1 in FIG. 10 may be disposed on the side of the master 101 or on the side of the module driver 102.

When the master 101 outputs a power supply instruction at S31, the module driver 102 starts the supply of electric power to the load 103 at S32. The load 103 starts operation when electric power is supplied thereto and transmits the load ID allocated thereto to the module driver 102 at S33.

The module driver 102 receives the load ID transmitted by the load 103, compares the load ID with the content of the ID table TB1 and determines an appropriate driver ID to be allocated to the module driver 102 itself at S34. After that, the module driver 102 transmits the determined driver ID to the master 101.

For example, in the case that the load ID received by the module driver 102 is "002", the received load ID "002" coincides with the load ID "002" (see FIG. 5) on the door area load ID data TB1*a*, whereby the module driver 102 itself recognizes that the module driver 102 is disposed in the door area. After that, the module driver 102 allocates the driver ID 61 "001-A" to itself.

The module driver 102 recognizes the area or module in which the module driver 102 itself is disposed according to the value of its own driver ID determined by itself and hereafter executes the function of the module corresponding to the driver ID (at S35).

For example, in the case that the driver ID "001-A" of the module in the door area is given to the module driver 102, the microcomputer 11 inside the module driver 102 selectively reads specific software allocated for the module in the door area from the ROM 11*a* and executes the software.

Furthermore, in the case that the driver ID "001-B" of the module in the roof area is given to the module driver 102, the microcomputer 11 inside the module driver 102 selectively reads specific software allocated for the module in the roof area from the ROM 11*a* and executes the software.

Moreover, in the case that the driver ID "001-C" of the module in the floor area is given to the module driver 102, the microcomputer 11 inside the module driver 102 selectively reads specific software allocated for the module in the floor area from the ROM 11*a* and executes the software.

Hence, even in the case that the module drivers 10 having a common configuration and a common part number are used as common components in various areas of the vehicle body 20, the module driver 10 disposed in each area can automatically select the software suitable for the area in which the module driver 10 is actually disposed and can appropriately control the corresponding module.

The allocation of a load ID to a "second load" may merely be processed in a way similar to the processing in the operation shown in FIG. 8. However, since the master 101 allocates a driver ID to the module driver 102 as shown in FIG. 8, the functions of the module driver 102 are reduced and the versatility thereof is enhanced.

In the operations shown in FIGS. 8 to 10, there may be a case in which it is judged that the module driver 10 to which the driver ID is to be allocated does not correspond to any area. In such a case, it is necessary that the microcomputer 11 of the module driver 10 or the master 101 performs a predetermined diagnostic function and that the user or the operator is requested to confirm whether the connection of each load is proper.

What's more, the operations shown in FIGS. 8 to 10 are assumed to be performed only once, for example, when vehicle assembly is completed or when the configuration of the vehicle is changed by the addition, change, removal, etc. of devices.

<Advantages of the On-Vehicle Controller>

For example, in the case that the on-vehicle controller shown in FIGS. 2 to 4 is configured, the highly versatile module drivers 10 having a common configuration and a common part number can be used for the module drivers MD1 to MD3 in any areas. Hence, the number of items of the module drivers 10 can be reduced, whereby component cost and working cost can be reduced drastically.

In addition, since the module driver 10 can properly recognize the area or the module in which the module driver itself is disposed on the basis of the driver ID allocated to itself, the module driver 10 can selectively obtain appropriate software from among various types of software held in the ROM 11a or the like and can achieve functions suitable for the configuration of the corresponding area. For example, the module driver 10 disposed in the door area is designed to select software that can appropriately control various loads located in the module in the door area on the basis of the driver ID. Furthermore, the module driver 10 can recognize the load ID of the load actually connected to each connector of the module driver 10 and can perform control suitable for the corresponding load ID in each connector. For example, in the case that a motor is connected as a load, the module driver 10 can control the rotation direction of the motor and can also control the rotation speed of the motor. Moreover, in the case that an illumination device such as a color LED is connected as a load, the module driver 10 can control the light emission color and luminance of the load.

Still further, in the case that the operation shown in FIG. 9 is performed, even in the case that some of "first loads" are erroneously assembled, an appropriate driver ID can be allocated to the module driver 10. Hence, malfunction of the on-vehicle devices due to the erroneous assembling of the "first loads" can be minimized.

The characteristics of the on-vehicle controller according to the embodiment of the present invention described above will be briefly summarized and listed in the following items [1] to [3].

[1] An on-vehicle controller, including:
module drivers (10, MD1 to MD3 and 102) capable of being disposed in the respective plurality of areas on a vehicle to control first loads (control section-equipped connectors 32, 33, 37, etc.) having their own load IDs and a power distribution section (an infrastructural power distribution box 22-1 and a master 101) configured so as to be able to communicate with the module drivers and so as to store the module driver IDs allocated to the respective plurality of areas while being associated with the respective load IDs, wherein the module driver has a function (S14) of obtaining the load ID from the first load and transmitting the load ID to the power distribution section, the power distribution section has a function (S15) of transmitting the module driver ID to the module driver on the basis of the received load ID, and the module driver has a function (S16) of obtaining its own module driver ID.

[2] The on-vehicle controller set forth in the above-mentioned item [1], wherein the module driver and the plurality of first loads to be controlled by the module driver are disposed in each of the plurality of areas, the information to be transmitted from the module driver to the power distribution section includes the plurality of load IDs obtained from at least the plurality of first loads, and the power distribution section determines the module driver ID on the basis of the plurality of load IDs (S21 to S27).

[3] An on-vehicle controller, including:
module drivers (10, MD1 to MD3 and 102) capable of being disposed in the respective plurality of areas on a vehicle to control a plurality of first loads having their own load IDs and a power distribution section (an infrastructural power distribution box 22-1 and a master 101) configured so as to be able to communicate with the module drivers and so as to store the module driver IDs allocated to the respective plurality of areas while being associated with the respective load IDs, wherein the power distribution section has a function of obtaining the respective load IDs from the plurality of first loads to be controlled by the respective module drivers via the respective module drivers and also has a function (S15 and S21 to S27) of transmitting the module driver IDs determined on the basis of the obtained respective load IDs to the respective module drivers, and the respective module drivers have a function (S16) of obtaining their own module driver IDs.

What is claimed is:

1. An on-vehicle controller, comprising:
   module drivers capable of being disposed in any one of a plurality of areas on a vehicle to control first loads having their own load IDs; and
   a power distribution section configured so as to be able to communicate with the module drivers and so as to store module driver IDs allocated to the plurality of areas while being associated with the respective load IDs, wherein
   each of the module drivers has a function of obtaining the load ID from each of the first loads in a respective one of the areas and transmitting the load ID to the power distribution section,
   the power distribution section has a function of transmitting the module driver ID to each of the module drivers on the basis of the load ID received, and
   each of the module drivers has a function of obtaining its own module driver ID.

2. The on-vehicle controller set forth in claim 1, wherein
a respective one of the module drivers and a plurality of the first loads to be controlled by the respective one of the module drivers are disposed in each of the plurality of areas,
the information to be transmitted from each of the module drivers to the power distribution section includes the plurality of load IDs obtained from at least the plurality of the first loads, and
the power distribution section determines the module driver ID on the basis of the plurality of load IDs.

3. An on-vehicle controller, comprising:
module drivers capable of being disposed in any one of a plurality of areas on a vehicle to control a plurality of first loads having their own load IDs; and
a power distribution section configured so as to be able to communicate with the module drivers and so as to store module driver IDs allocated to the plurality of areas while being associated with the respective load IDs, wherein
the power distribution section has a function of obtaining the respective load IDs from the plurality of first loads to be controlled by the respective module drivers via the respective module drivers and also has a function of transmitting the module driver IDs determined on the basis of the obtained respective load IDs to the respective module drivers, and
the respective module drivers have a function of obtaining their own module driver IDs.

\* \* \* \* \*